United States Patent Office 3,138,565
Patented June 23, 1964

3,138,565
FLAME-RETARDANT UREA-FORMALDEHYDE MOLDING COMPOUNDS
Frank B. Rosenberger, Maumee, and Harry Jolliff and Louis Campanaro, Toledo, Ohio, assignors to Allied Chemical Corporation, New York, N.Y., a corporation of New York
No Drawing. Filed July 21, 1959, Ser. No. 828,470
3 Claims. (Cl. 260—17.3)

This invention relates to urea-formaldehyde resin compositions, and more specifically, to urea-formaldehyde molding compounds in solid, particulate form that cure to products that have desirable flame-retardant characteristics.

Urea-formaldehyde resins generally have been known since the turn of the century and for many years have been employed as adhesives, as impregnants for laminating and binding purposes, for wet-strengthening paper and other fibrous materials, for rendering fabrics crease-resistant, for casting objects, and for molding articles. For each of these applications, the urea-formaldehyde resin compositions are prepared under differing conditions. For example, the molar relationships of the reactants are varied, a specific pH and temperature of the reaction mixture are chosen or varied during a given reaction, the reaction is continued for certain lengths of time, modifying materials are added at different times during the reactions, various additions are included, and the like, depending upon the intended use of the particular composition. Generally, in all the aforesaid applications, except the production of molding compounds, the urea-formaldehyde resin compositions are used in the form of syrups or solutions of varying viscosities, since such forms are obviously more readily usable in said applications. There are certain exceptions to the foregoing, such as urea-formaldehyde resin glues that may be prepared in the form of powders as by spray-drying the liquid form. In such cases, the spray-dried product may or may not comprise a filler.

On the other hand, molding compounds have always been prepared in the form of granular solids or powders that may or may not include fillers of various kinds; e.g., paper pulp, sawdust, litharge, asbestos, subdivided resins, whiting, lamp black, etc. Such form permits handling by the molder, ready introduction into molds of various configurations, and most importantly, the allowance of the application of heat and pressure during the molding operation without danger of the molding composition being squirted or squeezed from the mold.

The present invention is specifically directed to urea-formaldehyde molding compounds based on cellulosic fillers and modified to impart desirable flame-retardant characterisitcs to products cured therefrom.

Urea-formaldehyde molding compounds per se based on cellulosic fillers have been known and have had widespread commercial acceptance for many field applications for quite some time. For example, they are disclosed at least as early as in U.S.P. 1,536,882, issued May 5, 1925 and U.S.P. 1,846,853, issued February 23, 1932. Urea-formaldehyde molding compositions of this type are used successfully to produce numerous articles, as for example, switch plates, radio and television cabinets, clock casings, scale housings, buttons, cosmetic and jewelry containers, closures, cigarette holders, pipe stems, beads, and the like.

The above-noted long-time and wide-spread acceptance of urea-formaldehyde molding compounds based on cellulosic fillers has been due to many factors, in addition to the handling and molding characteristics already referred to above. Specifically, these commercial urea-formaldehyde molding powders have other excellent molding characteristics including minimum damage to expensive molds, and, when cured, result in articles that have desirable impact and other physical characteristics, including appearance and feel. Moreover, the hard, smooth surfaces of articles molded from these urea-formaldehyde molding compounds are easy to clean and are resistant to household chemicals, scratching, chipping, and cracking. The cured articles, in addition, have good electrical properties, and are odorless and tasteless.

The resultant articles are considered comparatively inert and resistant to heat. However, both the resins and the cellulosic fillers contained therein are organic, and hence, are combustible. Accordingly, the known molding compounds have been excluded from fields wherein the cured products would be exposed to high temperatures approaching the ignition temperature of the compositions or to direct flames, or in applications where relatively poor fire-retardance of urea-formaldehyde products is unsatisfactory if exposed to high temperature or flame.

The incorporation of additives to urea-formaldehyde molding compounds generally, for giving the compounds per se desirable properties, such as storage-stability, handling flowability, particularly in the mold, moldability, etc., and for giving products molded therefrom certain desired characteristics, such as strength, feel, appearance, etc., involves major problems. Thus, inclusion of liquid or highly viscous substances for plasticizing, lubricating, or any other purposes, may well result in stickiness in handling, squirting of the product from the mold and/or in migration and ultimate exudation of the substance in the finished product with loss of the property normally furnished by the substance and disagreeable feel and appearance. On the other hand, inclusion of additives in solid form poses the problem of proper blending into the compound to obtain the characteristics desired with uniformity throughout the mass thereof and of products molded therefrom. Moreover, whether the additive be liquid or solid, the physical and chemical incompatibility of such additive with the compounds in the storable and/or molded states is also highly probable. These same problems obtain if an additive is to be incorporated in urea-formaldehyde molding compounds for the purpose of giving the resulting products desirable fire-retardant characteristics.

A specific example of an application where a commercial urea-formaldehyde molding compound would otherwise be tremendously more valuable if its fire-retardancy were satisfactory, because of the many other characteristics of the cured product listed previously; is in the molding of light diffusors for use on or suspended below fluorescent lighting fixtures such as those disclosed in U.S. Patent 2,745,001. In such cases, the excellent optical characteristics of products derived from cellulosic-substance filled urea-formaldehyde molding compositions would also be a desirable advantage. At present, such light diffusors are produced commercially of styrene, acrylic compounds, plasticized vinyl and unplasticized vinyl. These substances, when polymerized, obviously result in combustible articles which are thermoplastic and for the most part have very poor fire-retardancy. Conventional urea-formaldehyde molding compounds, while superior in fire-retardancy to polystyrene, acrylic and plasticized vinyl, nevertheless possess only moderate fire-retardancy and are not sufficiently retardant to be acceptable for use under many building codes.

The Underwriters' Laboratories presently rate some thermoplastic light diffusors as acceptable on the basis that they may be used in conjunction with sprinkler systems and will melt and fall away from lighting fixtures as the temperature rises before the ignition temperatures of the compositions are reached. Other thermoplastic diffusors have a very poor rating.

It will be obvious that urea-formaldehyde molding compositions that will cure to products having markedly increased fire-retardant characteristics would have many other applications, such as the fabrication of grills and louvers for air-conditioning systems, the molding of handles for electric steam irons, the production of handles and trim for stoves, and the like. Obviously, the added safety factor of flame-resistance or flame-retardancy could be a desirable additional attribute of the many articles now commonly made with present-day commercial urea-formaldehyde molding compositions; e.g., television cabinets, radio housings, switch plates, etc. Moreover, Underwriters' Laboratories, Inc. has recently, in Bulletin 484, formally established standards for plastics to be employed in room air conditioners, which exclude from this use, conventional plastics other than flame-resistant types.

In view of the disadvantages and shortcomings of the prior art urea-formaldehyde molding compositions, referred to previously, it is a primary object of the present invention to provide novel urea-formaldehyde molding compositions that cure to flame-retardant articles.

It is another object of the present invention to provide the aforesaid novel urea-formaldehyde molding compositions that have the desirable handling, molding and curing characteristics of commercial urea-formaldehyde compounds now obtainable that do not have fire-retardant characteristics.

It is another object of the present invention to provide urea-formaldehyde molding compounds that, when molded, provide articles which are light-fast and have flame-retardance ratings that are many times better than the unsatisfactory ratings of conventional urea-formaldehyde molding compounds.

Yet another object of the invention is to provide urea-formaldehyde molding compounds that have all the properties referred to above and, in addition, cure to products having optimum physical characteristics, including strength, feel and appearance, and freedom from stickiness, bloom or other attributes of incompatibility or bleed out.

The foregoing objects and other objects and advantages obtained by the present invention will appear from the description thereof that follows.

The invention resides generally in the production of novel molding compounds that comprise a solid, particulate mixture of (1) urea-formaldehyde resin, (2) a minor amount of a cellulosic filler, and (3) a minor amount of a solid, stable chlorine-containing hydrocarbon composition having a chlorine content of from 45%–70%. The greatly improved fire-retardant characteristics of articles molded from said novel urea-formaldehyde compounds is increased to an even more remarkable extent by the inclusion of (4) a minor amount of antimony trioxide therein. In the preferred embodiments of the invention, whether antimony trioxide is included or not, the solid stable chlorine-containing hydrocarbon composition is a polymer, and most preferably is polyvinyl chloride. Preferably, the solid particulate mixtures are in granular or powder form and contain one or more of the additives conventionally included in urea-formaldehyde molding compositions of the prior art, as referred to in the discussion of such compounds below.

Urea-formaldehyde molding compounds of the prior art now in use are commonly made by processes which may include the steps given below:

Urea and formaldehyde are condensed in aqueous solution within a pH range of 6–10 for several hours at relatively low temperatures, e.g., 20° to 40° C., to produce a resinous syrup. The resinous syrup is then combined with alpha cellulose and/or other, or a combination of other cellulosic-type fillers. Water is then removed from the resin-filler mixture by drying the same from one to several hours at temperatures from 140° to 210° F. The dried product obtained is then ground, and there are then dispersed therein minor ingredients, such as accelerators, stabilizers, plasticizers, pigments, and lubricants of conventional types, as referred to below.

Typical accelerators presently in use, which function as latent catalysts that hasten cure during molding under heat and pressure, are oxalic acid, benzoic acid, phthalic acid, hydrobromocinnamic acid, trimethyl phosphate, benzoyl peroxide, and ethylene bis-benzene sulfonate. Typical stabilizers now in use, that function to retard premature curing under storage conditions are hexamethylenetetramine and ammonium carbonate. Typical plasticizers in use, that provide plasticization of the compositions during the molding operation, are glycerine, monoethers of glycerine, butyl urea and toluene sulfonamide. Typical lubricants, that function as mold release agents for the cured articles, are long-chain aliphatic acids, such as stearic acid and oleic acid, as well as their metal salts, such as zinc stearate and zinc oleate.

Conventional pigments; e.g., titanium dioxide, Hansa yellow, etc., may be omitted or included as desired, depending upon the transparency, translucency and color of the product that the molder is interested in.

TYPICAL UREA-FORMALDEHYDE MOLDING COMPOUND

A typical formulation of a commercial urea-formaldehyde molding compound of the prior art is as given below:

| Component: | Parts by weight |
|---|---|
| Urea | 1400 |
| Formalin (50%) | 2100 |

The above components are combined, the pH of the solution is adjusted to 7–9, and the solution reacted for from 3–5 hours at about 25° C. Thereafter, 2610 parts by weight of the resinous syrup produced by the reaction just described are admixed with 567 parts by weight of dry alpha cellulose filler. The syrup and filler are combined in a mixer for about 15 minutes, and thereafter, the wet resin-filler mixture is discharged into an oven and dried from one to several hours at temperatures from 140° to 210° F., as referred to above. The resin filler ratio in this typical dried product is 73:27, although the filler limits may vary from 15–40% of the mixture. The dried product is then combined with accelerator, stabilizer, plasticizer, lubricant, and pigment components, as referred to above, in a typical formulation as given below:

| Components: | Parts by weight |
|---|---|
| Dried urea-formaldehyde resin, alpha cellulose filler product | 500 |
| Ethylene-bis-benzene sulfonate (accelerator) | 1 |
| Hexamethylenetetramine (stabilizer) | 0.5 |
| Butyl urea (plasticizer) | 5 |
| Zinc stearate (lubricant) | 3 |
| Titanium dioxide (pigment) | 7 |

The mixture of the above is reduced to a fine powder in a ball mill to give the final molding powder.

When a molding compound of the prior art, exemplified by the foregoing formulation, is used for molding articles, for example, as light diffusors, such as those disclosed in the aforesaid U.S.P. 2,745,001, the resulting articles give a rating of 200–275 when they are subjected to tests according to the Underwriters' Laboratories, Inc. "Test for Fire Hazard Classification of Building Materials," which is a widely accepted test for rating flame-resistance or retardancy by measuring the extent of flame propagation by a test piece of material under standardized conditions in a chamber or tunnel. The said rating of the standard urea-formaldehyde molding compound is considered to be unsatisfactory by many fire prevention and building code authorities.

In accordance with our invention, urea-formaldehyde molding compounds of the prior art, exemplified by the formulation given above, have included therein, prior to final reduction to the usable powder, a minor amount of a compatible solid stable chlorine-containing hydrocarbon composition having a chlorine content of from 45%–70%, the composition preferably being present in an amount of from 5% to 25% of the total weight of the molding compound. The addition of said solid stable composition, within the range specified, has been found to increase the flame-retardance of articles molded therefrom to a remarkable degree, with no substantial reduction of the desirable characteristics of the usual urea-formaldehyde molding compounds with respect to handling, effect on the mold, curing, and physical characteristics of the resultant products, including strength, feel and appearance.

The term "stable" as used herein to define the solid chlorine-containing compositions contemplated by the present invention, refers to the stability of said compositions both during molding of the urea-formaldehyde compounds containing them, and under service conditions to which products molded therefrom are exposed with respect to evolvement of chlorine in the form of HCl. Such evolvement during molding of the urea-formaldehyde compositions has been found to be highly deleterious to the molds per se that may be quite expensive, and to cause degradation of the cured products during use. The term is intended to cover those chlorine-containing compositions useful in the exercise of the present invention that are inherently stable due to their chemical composition, as for example, vinylidene chloride polymers and some vinyl chloride polymers. The term is also intended to cover those chlorine-containing compositions that may not be inherently stable under the conditions referred to above but which have stabilizing substances included that function to avoid the formation of the deleterious gases under conditions that might otherwise cause such formation. For example, in the case of certain polyvinyl chloride polymers that are subjected in the urea-formaldehyde molding compounds of the invention to temperatures over periods of time above the critical limits characterising such compositions; known heat-stabilizers, such as calcium carbonate, calcium stearate, tin stearate, zinc stearate, zinc resinate, and inorganic salts of copper, manganese, and zinc, may be included. Similarly, heat-stabilizers may be included with other non-stable chlorine-containing compositions otherwise useful for exercising the invention.

In accordance with a preferred embodiment of the invention, there is added to the conventional urea-formaldehyde molding compound, and in addition to the solid stable chlorine-containing compound, an amount of antimony trioxide within the range of from ½% to 10.0% by weight of the molding compound. Upon addition of the antimony trioxide, within the range specified, the amount of solid stable composition containing chlorine in the compound is then reduced to from ½% to 15% by weight of the entire composition. The minimum proportions of chlorine-containing composition and $Sb_2O_3$ providing the "B" code ratings discussed below, may be expressed by the equation $$P = \frac{12}{6A+1}$$

where $P$=percent chlorine-containing composition, and $A$=percent $Sb_2O_3$ in the composition. The inclusion of antimony trioxide results in urea-formaldehyde molding compounds that likewise have desirable characteristics with respect to handling, effect on mold, curing, and physical characteristics of the resultant products. However, the inclusion of antimony trioxide in the amount specified results in significant improvement of flame-retardance of the cured products when compared to those in which a composition containing chlorine has been added alone in accordance with the present invention, and, of course, that much more than is obtained in urea-formaldehyde molding compounds of the prior art.

As the solid polymer of an ethylenically unsaturated chlorine-containing composition, polyvinyl chloride is preferred. However, other solid polymers of ethylenically unsaturated chlorine-containing compositions, as for example, vinyl chloride-vinylidene chloride copolymers, vinyl chloride-vinyl acetate copolymers, polyvinylidene chloride, and the like, that meet the requirements of the invention with respect to stability and chlorine content, may be employed to obtain the benefits of the invention.

The following examples illustrate the fire-retardant compositions of the present invention in greater detail. All parts are given by weight:

Example 1

A urea-formaldehyde molding compound was prepared by a procedure identical to that described under "Typical Urea-Formaldehyde Molding Compound" from the formulation given below that also included 17% by weight polyvinyl chloride, and no pigment:

| Component: | Parts by weight |
|---|---|
| Dried urea-formaldehyde filler product | 500 |
| Ethylene bis-benzene sulfonate | 1 |
| Hexamethylenetetramine | 0.5 |
| Butyl urea | 5 |
| Zinc stearate | 3 |
| Polyvinyl chloride ("Geon" 121)[1] | 100 |

[1] "Geon" 121, manufactured by B. F. Goodrich Company, is stable per se up to temperatures of approximately 325° F.

The above compound was molded at a temperature of about 310° F. into an "egg-crate" type louver having dimensions of 8 inches by 8 inches and, when tested by the Underwriters' Laboratories Inc. "Test for Fire Hazard Classification of Building Materials," had a rating of 69, which is within the retardancy range of 26–75, that is accepted by some building codes, using the following rating scale:

| | |
|---|---|
| A | 0–25 |
| B | 26–75 |
| C | 75–200 |
| D | 200–500 |
| E | Over 500 |

Example 2

Another urea-formaldehyde molding compound was prepared by a procedure identical to that used for the production of conventional urea-formaldehyde molding compound as in the case of Example 1, but from the formulation given below, that also included 6¼% by weight polyvinyl chloride and 2⅔% by weight antimony trioxide, but no pigment:

| Component: | Parts by weight |
|---|---|
| Dried urea-formaldehyde, filler product | 500 |
| Ethylene-bis-benzene sulfonate | 1 |
| Hexamethylenetetramine | 0.5 |
| Butyl urea | 5 |
| Zinc stearate | 3 |
| Polyvinyl chloride ("Geon" 121) | 35 |
| Antimony trioxide | 15 |

When the above compound was molded into a strip having dimensions of 24″ x 24″, the greatly improved flame-retardance was demonstrated by a rating of 25 by the Underwriters' Laboratories Inc. test used in Example 1. The improved fire-retardant qualities of articles prepared therefrom are evident from comparison with articles prepared from conventional unmodified urea-formaldehyde compounds, which give an unsatisfactory rating of 200–275, and with articles prepared from a molding compound in accordance with Example 1, that contain almost three times the amount of polyvinyl chloride but no antimony trioxide, which give a retardancy rating of 60–75 and which do not have optimum molding properties.

Moreover, the compound that includes both polyvinyl chloride and antimony trioxide in accordance with this example results in the aforesaid improvement in flame-retardance of the cured products with no substantial reduction of the desirable characteristics of urea-formaldehyde molding compounds with respect to handling, effect on mold, curing, and other desirable attributes of the finished products, such as impact resistance, chemical resistance, electrical qualities, feel, and the like.

Example 3

Utilizing molding compounds similar to that described in Example 2, except that the polyvinyl chloride ("Geon" 121) content was varied and antimony trioxide was omitted in some cases and the amount of inclusion varied in others, the following series of molding compounds was prepared and resulted in the Underwriters' Laboratories Inc. test ratings as given in the Table I below:

TABLE I

| Compound | Percent PVC | Percent $Sb_2O_3$ | UL Test Rating |
| --- | --- | --- | --- |
| A | 3 | 0 | 256 D |
| B | 6 | 0 | 95 C |
| C | 12 | 0 | 75 B |
| D | 17 | 0 | 69 B |
| E | 1.5 | 1.5 | 65 B |
| F | 3 | 3 | 49 B |
| G | 6 | 1 | 54 B |
| H | 6 | 2 | 35 B |
| I | 6 | 3 | 35 B |
| J | 10 | 1 | 46 B |

Since, in accordance with the Underwriters' Laboratories Inc. "Test for Fire Hazard Classification of Building Materials," a "B" rating is regarded as acceptable by many building codes (and an "A" rating as obviously preferable), it will be clear that compounds containing both polyvinyl chloride and antimony trioxide give more desirable results. While loading of the compound with polyvinyl chloride tends to reduce the aforesaid Underwriters' Laboratories Inc. test rating, the molding characteristics of the compound are impaired somewhat commensurately.

Example 4

A series of urea-formaldehyde molding compounds were prepared by the method described under "Typical Urea-Formaldehyde Molding Compound" from the formulation utilized in Examples 1 and 2, with the difference that the polyvinyl chloride and polyvinyl chloride-antimony trioxide combination, respectively, were substituted for by the substances given in Table II below:

TABLE II

| Compound | Substituted Substance | Parts by Weight | Commercial Designation |
| --- | --- | --- | --- |
| K | Vinyl Chloride-Vinylidene Chloride Copolymer. | 25 | "Geon" 204. |
| L | Vinyl Chloride-Vinylidene Chloride Copolymer. Plus Antimony Trioxide | 25 3¾ | Do. |
| M | A Chlorinated Petroleum Wax Product. | 25 | "Chlorowax" 70S. |
| N | A Chlorinated Petroleum Wax Product. Plus Antimony Trioxide | 25 3¾ | Do. |
| O | Polyvinyl Chloride | 25 | "Geon" 101. |
| P | do | 25 | "Geon" 103EP. |
| Q | do | 25 | "Geon" 121. |
| R | Poly (Vinyl Chloride-Vinyl Acetate). | 25 | "Geon" 428. |
| S | Poly (Vinyl Chloride-Vinyl Acetate). Plus Antimony Trioxide | 25 3¾ | Do. |
| T | Octochloronaphthalene | 25 | "Halowax" (1051X). |
| U | Octochloronaphthalene Plus Antimony Trioxide | 25 3¾ | Do. |
| V | None (Control) | | |

The above molding compounds K–V were then tested for fire-retardancy by use of the "Flammability Test" appearing on page 6 of Underwriters' Laboratories Inc. Bulletin 484, dated January 14, 1959, and entitled "Test Procedure for Evaluating Plastic Materials Used in Room Air Conditioners." Briefly, this test applies a flame from a common laboratory gas burner under specified conditions to a plastic sample ½ inch by 1/16 inch by 6 inches. The flame is applied to the vertically suspended test piece for 10 seconds and then withdrawn. If the flaming does not continue for more than 30 seconds after the removal of the flame, the test flame is again immediately placed under the specimen for 10 seconds, again withdrawn and the duration of the flaming noted. The sample is subjected to two such 10 seconds flame applications.

To be considered as meeting the test, it is required that the duration of the flaming shall not average more than 25 seconds or exceed 30 seconds maximum after removal of the test flame from the test piece.

The results of the tests are given in Table III below:

TABLE III

| Compound | Percent Cl | Burning Subsequent to Flame Applications | | Remarks |
| --- | --- | --- | --- | --- |
| | | First Application, seconds | Second Application, seconds | |
| K | 62 | None | 3 | Excellent feel and color. |
| L | 62 | do | None | Do. |
| M | 70 | do | 3 | Test pieces discolored. |
| N | 70 | do | 2 | Do. |
| O | 57 | do | 2 | Good feel but poor color. |
| P | 57 | do | 2 | Do. |
| Q | 57 | do | 3 | Excellent feel and color. |
| R | 46 | do | 2 | Vinyl Copolymer incompatible with Urea-Formaldehyde as evidenced by small pin-point protrusions on surfaces. |
| S | 46 | do | None | Do. |
| T | 70 | 0 | 4 | Distinctly yellow coloration of test pieces. Purple discoloration after exposure to light. |
| U | 70 | 0 | 2 | Do. |
| V | 0 | 0–5 | 20–60 | Excellent feel and color. |

The foregoing demonstrates that, of the various formulations, only urea-formaldehyde compounds modified by inclusion of a solid stable polymer or copolymer of an ethylenically unsaturated chlorine-containing composition having a chlorine content of from 45%–70%, or of solid stable hydrocarbon compositions having said chlorine content, or by inclusion of either of said solid stable chlorine-containing compositions in conjunction with antimony trioxide, result in products having optimum characteristics in flame-retardancy in conjunction with other desirable properties, such as excellent feel and appearance.

While certain preferred embodiments of the fire-retardant molding compounds of the invention have been disclosed for purposes of illustration, it will be evident that various changes and modifications may be made therein without departing from the scope and spirit of the invention.

We claim:

1. A thermosettable molding compound that is a solid particulate composition comprising: (1) at least 75% of a mixture containing from 60 to 85 weight percent urea-formaldehyde resin and from 15 to 40 weight percent of total filler essentially consisting of alpha cellulose; (2) a minor amount up to 15 weight percent based on total composition of a compatible solid stable chlorine-containing hydrocarbon composition having a chlorine content of from 45–70 weight percent; and (3) from ½ to 10 weight percent based on total composition of antimony trioxide; the minimum proportion of said chlorine-containing compound present being expressed by the equation $$P = \frac{12}{6A + 1}$$

where $P$ = weight percent chlorine-containing composition and $A$=weight percent antimony trioxide in the solid composition.

2. A thermosettable molding compound as claimed in claim 1, wherein said compatible solid stable chlorine-containing hydrocarbon composition is a polymer of an ethylenically unsaturated chlorine-containing hydrocarbon composition.

3. A thermosettable molding compound as claimed in claim 2, wherein said polymer is polyvinyl chloride.

References Cited in the file of this patent
UNITED STATES PATENTS

| | | |
|---|---|---|
| 2,118,549 | Cochrane | May 24, 1938 |
| 2,416,447 | Laughlin et al. | Feb. 25, 1947 |
| 2,480,298 | Happoldt | Aug. 30, 1949 |
| 2,611,694 | Becher | Sept. 23, 1952 |
| 2,680,102 | Becher | June 1, 1954 |
| 2,810,700 | Bornstein | Oct. 22, 1957 |